Dec. 3, 1963  E. L. FIX  3,113,034
METHOD OF DYEING PLASTIC SHEETS FOR CURVED
LAMINATED GLASS ASSEMBLIES
Filed Feb. 4, 1955  2 Sheets-Sheet 1

INVENTOR.
EARL LESTER FIX

ATTORNEY

Dec. 3, 1963 E. L. FIX 3,113,034
METHOD OF DYEING PLASTIC SHEETS FOR CURVED
LAMINATED GLASS ASSEMBLIES
Filed Feb. 4, 1955 2 Sheets-Sheet 2

INVENTOR.
EARL LESTER FIX
BY Oscar L Spencer
ATTORNEY 3,113,034
METHOD OF DYEING PLASTIC SHEETS FOR CURVED LAMINATED GLASS ASSEMBLIES
Earl Lester Fix, New Kensington, Pa., assignor to Pittsburgh Plate Glass Company, Allegheny County, Pa., a corporation of Pennsylvania
Filed Feb. 4, 1955, Ser. No. 486,053
3 Claims. (Cl. 117—4)

This invention relates to a thermoplastic interlayer for a curved laminated glass assembly having a colored, light-absorbing band in a marginal area of the thermoplastic interlayer. The present invention more especially relates to a method for the preparation of interlayers by the continuous dyeing of a thermoplastic sheeting in web form with a nonrectilinear colored band and cutting of the dyed sheeting into interlayers for the curved laminated glass assemblies.

Windshields of automobiles utilize laminated glass assemblies comprising two sheets of glass and a thermoplastic interlayer such as a sheet of plasticized polyvinyl butyral resin, commonly known as Vinal. In the current models of automobiles these glass assemblies are bent along the longitudinal axis and in some of the assemblies their ends are twisted about the longitudinal axis thus producing a compound curvature. In the manufacture of these curved laminated glass assemblies a thermoplastic interlayer is placed between two matched curved glass sheets and the resulting sandwich is subjected to a laminating process to form a transparent laminated glass assembly. The thermoplastic interlayer is provided with a marginal rectilinear or straight band of a light-absorbing material in order to reduce glare from the sun when the laminated glass assembly is mounted as a windshield in an automobile. The marginal band is preferably graduated in concentration of light-absorbing material with the greatest concentration of light-absorbing dye being present nearest the periphery of the thermoplastic interlayer and the dye concentration in the band diminishes gradually toward the other edge of the band until the amount at the other edge is almost imperceptible. When a laminated glass assembly with such a graduated dyed band in the plastic interlayer is mounted in a tilting or nonvertical fashion the cutoff point between the dyed band and the undyed portion is nonhorizontal in appearance to a person inside the car. In order to provide an apparent horizontal cutoff line between the dyed band and the nondyed portion it is necessary to provide on a flat thermoplastic interlayer a dyed band which is curved along at least a portion of its longitudinal axis.

A flat thermoplastic interlayer or sheet having a curved colored band suitable for use as an interlayer in a curved laminated glass assembly has been prepared from a thermoplastic sheet having a straight colored band by differential stretching of the sheet until the colored band is curved and then heating the sheet while in the stretched condition in order to relieve stresses. The sheet was then cooled to room temperature while still in a stretched condition. Such a method entails batch operation and utilizes frames for stretching the thermoplastic sheets. This method is also limited with respect to the amount of stretch that can be used as well as with respect to the degree and type of curvature obtainable.

It is an object of the present invention to provide a continuous method for the preparation of thermoplastic sheeting having a nonrectilinear colored band in a repeating pattern that can be cut to provide plastic interlayers for laminated glass assemblies having a marginal glare-reducing band which is curved along a portion of this longitudinal axis.

It is another object of this invention to provide a continuous method for the dyeing of a thermoplastic sheeting to produce a thermoplastic sheeting having a scalloped colored band in a repeated pattern so that there can be cut from the dyed thermoplastic sheeting a number of interlayers each having a curved colored band for use in curved laminated glass assemblies.

It is another object of the present invention to provide a method for the preparation of thermoplastic interlayers for curved laminated glass assemblies and having a nonrectilinear colored marginal band by dyeing of thermoplastic sheeting to obtain the band in a repeating pattern in combination with intermittent or semi-continuous cutting of the dyed sheeting to pattern.

It is still a further object of the present invention to provide a continuous method for the preparation of thermoplastic sheeting having a nonrectilinear graduated colored band from which plastic interlayers each having a curved colored graduated band can be cut.

Another object is to provide a method of preparing a curved laminated glass assembly with curved colored band.

These and other objects of the present invention will be apparent from the description which follows.

In accordance with a preferred embodiment of this invention a thermoplastic sheeting in web form is drawn across a rotating dyeing means, such as a dye-printing roll, containing a light-absorbing dye while reciprocating the rotating dye-printing roll along its axis of rotation. The dye-printing portion of the dye-printing roll is narrower than the web of thermoplastic material so that only a narrow band of dye is applied to the web and due to the reciprocation of the printing roll the dyeing operation produces a series of connected curved bands or bands which are curved along at least a portion of their lengths. The web after passing across the reciprocating and rotating dyeing roll is then heated by feeding through a heated chamber for removing solvent used for carrying the dye to the printing roll and thence to the web and for removing any mottled effect resulting from the dye-printing operation. The web coming from the heated chamber can be cut transversely into suitable lengths and in each of the cut pieces there is a narrow band of light-absorbing dye having a curvature along part of its longitudinal axis and preferably being graduated in dye intensity across the width of the band. In the preferred embodiment the dyed web is not merely cut to predetermined lengths but rather is fed intermittently from the continuous dyeing and drying operations to a cutting assembly for cutting to pattern therefrom interlayers for the laminated glass assemblies.

The apparatus for dyeing the nonrectilinear colored band on the web in a continuous manner in the preferred embodiment comprises a dye-printing roll adapted for graduated printing and mounted for rotation about its longitudinal axis and for reciprocation along its axis of rotation, an ink roll for applying dye to the printing roll, gear and cam means for rotating and reciprocating the printing roll, a heated chamber for drying the dyed thermoplastic web, and means for conveying the web of thermoplastic material across and in contact with the dye-printing roll. The apparatus for the preparation of the interlayers combines the continuous apparatus for dyeing a band on the web and for drying the web with a pattern-cutting assembly having a cutting die intermittently operated and fed with web from the continuous apparatus utilizing a dancer roll assembly ahead of the cutting assembly to take up the feed of the web from the continuous apparatus during the operation of the die press of the cutting assembly.

In another embodiment of this invention it is unnecessary to reciprocate the dye-printing roll along its axis of rotation. In this embodiment the rotating dye-printing roll is provided with a dye-printing portion, preferably adapted to provide graduated printing, in which at least one edge of the dye-printing portion is nonplanar so that dye-printing of a thermoplastic web with such roll produces a nonrectilinear colored band on the web.

For a more complete understanding of the nature and scope of this invention reference can be had to the following detailed description taken in connection with the accompanying drawings in which.

Figure 1:
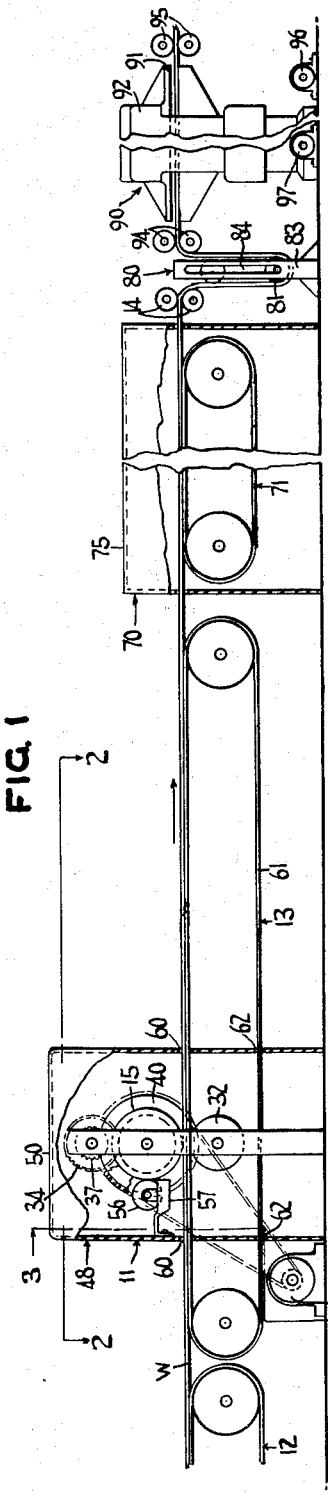
FIGURE 1 is a side elevation, partly broken away, of the apparatus of the present invention.

The web W of thermoplastic sheeting such as Vinal is fed (in the direction shown by the arrow in FIGURE 1) continuously through the dye-printing assembly generally indicated at 11 by means of continuous conveyors generally indicated at 12 and 13. Web W is kept taut by means of a pair of rolls 14. The dye-printing assembly 11 has a dye-printing roll 15 rotatably mounted by shaft 16 journalled to vertical support 18.

One end of shaft 16 is slidably keyed within the hollow portion 19 of shaft 20 journalled in vertical support 21. Sprocket 23 mounted on shaft 24 of motor 25 is connected to sprocket 26 mounted on shaft 20 by means of chain 27. Gear 28 on shaft 20 meshes with gear 29 mounted on shaft 30 which is journalled in vertical supports 18, 21 and 31. Pressure roll 32, which is preferably rubber covered, is mounted on shaft 30 between vertical supports 18 and 31.

Gear 33 keyed on shaft 16 meshes with gear 34 keyed on sleeve 35 mounted on fixed shaft 36 for free rotation and sliding action therealong. Shaft 36 is mounted to vertical supports 18 and 21. Gear 37 also keyed on sleeve 35 meshes with gear 38 mounted on shaft 16 for free rotation. Gear 38 is abutted by circular plate 39 and cam 40 also mounted on shaft 16 for free rotation and between collars 41 and 42 fixed on shaft 16 by screws (not shown). Plate 39 and cam 40 have larger diameters than gear 38 and their opposed faces at the periphery abut opposite faces of gear 37 meshing with gear 38 in groove 43 thus provided between the opposed surfaces of plate 39 and cam 40. Cam follower finger 44 rigidly mounted on horizontal support 45 engages groove 46 of cam 40.

The dye-printing assembly 11 includes a housing generally indicated at 48 having a roof 50, end walls 51 and 52, and front and rear walls 53 and 54 to minimize loss by volatilization of the solvent used in dye solution 55. Solution 55 is fed to dye-printing roll 15 by ink roll 56 rotatably mounted in trough 57. Ink roll 56 is in rolling contact with printing roll 15. Trough 57 is mounted to wall 53. Scraper 58, preferably made of a resilient material, is mounted on trough 57 and frictionally engages the surface 59 of printing roll 15 to remove excess dye therefrom.

Walls 53 and 54 of housing 48 have upper slots 60 for passage of web W and conveyor belt 61 of continuous conveyor 13. Walls 53 and 54 also have lower slots 62 for return passage of belt 61.

A dye solution 55, such as hereinafter described, is placed in trough 57 and is fed to printing roll 15 by means of ink roll 56 which rotates due to frictional engagement with surface 59 of printing roll 15. Scraper 58 removes all dye solution from printing roll 15 except dye solution in concavities 64 in surface 59. Printing roll 15 imparts dye solution 55 from concavities 64 to web W and the transferred dye solution on web W has a mottled effect initially but passage of the thermoplastic web W through dye-setting assembly generally indicated at 70 where heating of the web results in diffusion of dye as well as removal of solvent so that a non-mottled appearance results.

The dye-setting assembly 70 contains continuous conveyor 71. Web W is fed to conveyor 71 by conveyor 13 and rolls 14 mounted beyond conveyor 71. Rolls 14 insure web W is in taut condition when passing across and in contact with printing roll 15 and through assembly 70. Dye-setting assembly 70 includes housing 75 in which are provided heating means (not shown) for maintaining the interior of the housing at an elevated temperature such as 50° C.

Web W passing from dye-setting assembly 70 and through rolls 14 is fed to a dancer roll assembly generally indicated at 80 and which includes dancer roll 81 mounted between two vertical supports 83. Vertical slots 84 are in supports 83 to permit vertical movement of dancer roll 81.

A die press generally indicated at 90 includes an upper die member 91 mounted in movable head 92 of die press 90. The cutting dies are set in plywood (not shown) attached to die member 91. A pair of in-running feed rolls 94 is mounted between die press 90 and dancer roll assembly 80 and a pair of pull rolls 95 is mounted on the other side of die press 90. Rolls 94 and 95 are powered by motor 96. Movable head 92 of press 90 is powered by electric motor 97.

Figure 6:
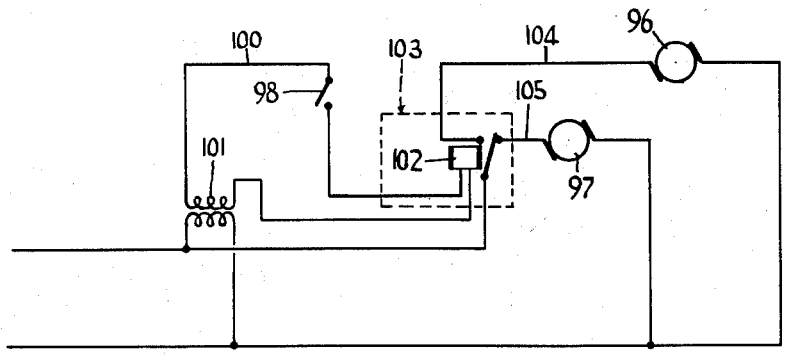
FIGURE 6 is a circuit diagram of the mechanism for intermittently operating the die press assembly of the invention.

Switch 98 mounted on shaft 36 and spring-biased in closed position is momentarily opened by dog 99 on cam 40. As seen in FIGURE 6 switch 98 is in low voltage circuit 100 including the secondary coil of transformer 101. The primary coil is connected to a 220-volt line. Switch 98 controls solenoid 102 of timer relay generally indicated at 103 which controls circuits 104 and 105 supplying electricity to motors 96 and 97, respectively, from the 220-volt A.C. line. Momentary deenergization of solenoid 102 by opening switch 98 opens circuit 104 and closes circuit 105 for a time predetermined by setting of timer relay 103 which then closes circuit 104 and opens circuit 105. A suitable timer relay is described in common assignee's copending application Serial No. 275,498, filed by Harry A. Smith, Jr., on March 8, 1952, now U.S. Patent No. 2,763,928, granted on September 25, 1956.

As web W leaves rolls 95 it can be conveyed to a table (not shown) where the interlayer insert cut from the web by die press 90 can be removed from the web.

Figure 5:
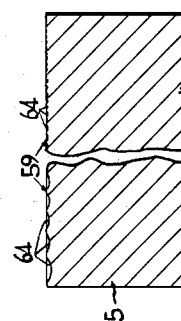
FIGURE 5 is an enlarged fragmentary vertical cross section of a preferred dye-printing roll taken along the line 5—5 of FIGURE 3.

As shown in FIGURE 5, in the preferred embodiment dye-printing roll 15 is provided with a surface 59 adapted to provide graduated printing of the dye to a portion of web W. Surface 59 has a large number of concavities 64 extending around roll 15 and across roll 15. In the cross section shown in FIGURE 5 it is seen that concavities 64 at one end of the roll are larger and deeper than elsewhere and that concavities 64 at the other end of the roll are considerably smaller and shallower while concavities 64 in between are graduated between the largest and the smallest.

Figure 2:
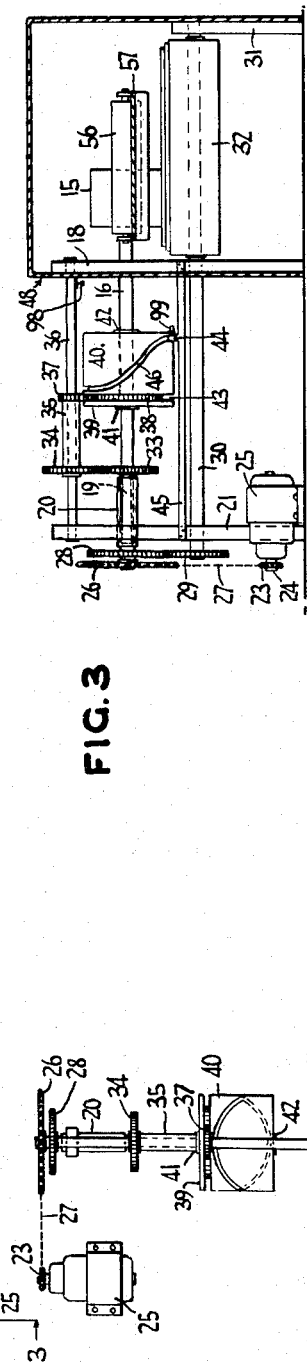
FIGURE 2 is a horizontal section taken along line 2—2 of FIGURE 1 showing the web, the web-conveyor and the dye-printing assembly including a preferred embodiment of a dye-printing roll.

The band B printed on web W is shown in FIGURE 2 and the band is graduated by use of roll 15 having concavities 64 as shown in FIGURE 5. The dotted outline on web W in FIGURE 2 is the pattern of an interlayer for a laminated glass assembly as cut out by die press 90.

Figure 3:
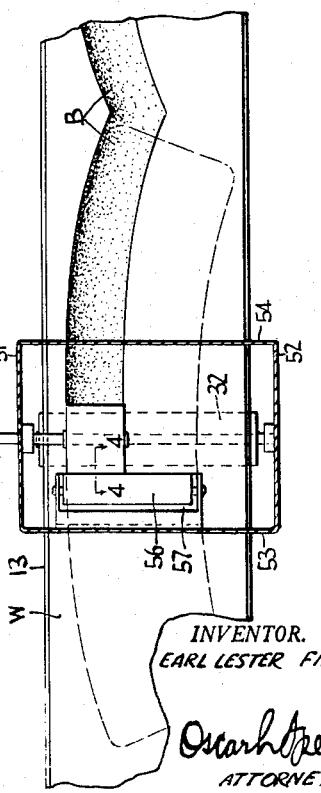
FIGURE 3 is a transverse section taken along line 3—3 of FIGURE 1 showing the dye-printing assembly.
Figure 4:
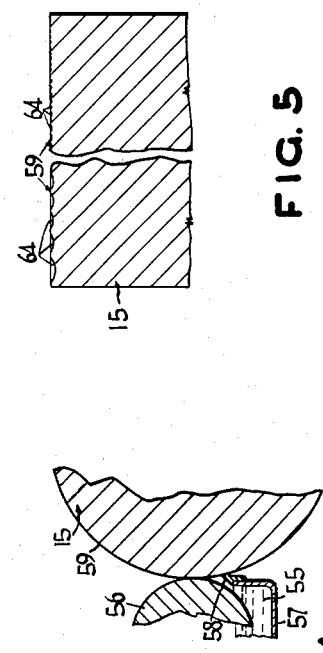
FIGURE 4 is an enlarged fragmentary cross section taken along the line 4—4 of FIGURE 2 showing the dye-printing roll along with the apparatus for applying dye to the roll and removing excess dye therefrom.
Figure 7:
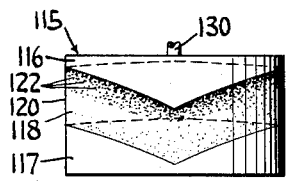
FIGURE 7 is a top plan view of another embodiment of a dye-printing roll for a dye-printing assembly of this invention.

A second embodiment of a dye-printing roll for use in a dye-printing assembly for the preparation of a web of thermoplastic material having a nonrectilinear colored band is shown in FIGURE 7. Roll generally indicated at 115 has nonprinting portions 116 and 117 and dye-printing portion 118. Both edges of portion 118 are nonplanar. The surface 120 of dye-printing portion 118 of roll 115 has concavities 122 which can be graduated longitudinally as to depth and width like concavities 64 in dye-printing roll 15 as shown in FIGURE 2 to provide graduated printing of the dyed web W. Concavities 122 can be graduated in size and depth around the circumference to provide greater dye intensity at the ends of a band in an interlayer. Roll 115 is mounted on shaft 130. Dye-printing assembly 11 can be modified, of course, to incorporate dye-printing roll 115. Roll 115 necessarily has a larger diameter than roll 15 because roll 115 by one revolution prints dye 55 on web W for one interlayer. As a result wall 53, ink roll 56 and trough 57 are suitably displaced. Reciprocating means, such as cam 40 etc., are unnecessary so that sprocket 26 can be mounted directly on shaft 130. As in FIGURES 1 through 3, sprocket 26 is driven by motor 25 by means of sprocket 23 and chain 27. Of course, dye-printing portion 118 can extend to one edge of roll 115.

*Operation*

Web W is fed by conveyor 12 to conveyor 13 and thence between printing roll 15 and pressure roll 32 within housing 48. Pressure roll 32 supports the entire width of web W and conveyor belt 61. Motor 25 drives shaft 30 and pressure roll 32 by means of sprockets 23 and 26 and chain 27 as well as gears 28 and 29. Roll 15 is rotated by motor 25 by means of sprockets 23 and 26, chain 27 and shafts 16 and 20. Rotation of shaft 20 produces rotation of cam 40 by means of gears 33, 34, 37 and 38. Cam follower finger 44 causes longitudinal movement of rotating cam 40 resulting in longitudinal movement of gear 38 and plate 39 and thus longitudinal movement of gear 37, sleeve 35 and gear 34. Movement of cam 40 and plate 39 moves shaft 36 and thus moves gear 33 along its axis of rotation. The type of reciprocation of roll 15 is dependent upon the shape of annular groove 46 in cam 40. Obviously many different groove contours will provide many variations in the reciprocation of roll 15 resulting in various shapes of nonrectilinear bands dyed on web W. The sizes of gears 33, 34, 37 and 38 are chosen to provide a predetermined degree of rotation of roll 15 per complete revolution of cam 40. For example, for a particular pattern of scalloped design to be printed on web W of thermoplastic material it is desirable for roll 15 to make at least about three complete revolutions per complete revolution of cam 40. This permits reduction of size of roll 15 and thus reduces cost of fabrication of a roll with concavities in the surface.

Web W with the printed band thereon is drawn by rolls 14 onto conveyor 71 within dye-setting housing 75 in which web W is heated to an elevated temperature, e.g., about 50° C. Web W is then drawn between rolls 14, around dancer roll 81 and up through rolls 94 and thence through die press 90 and between rolls 95. Operation of conveyors 12, 13 and 71, dye-printing roll 15, pressure roll 32, and rolls 14 is continuous. Die press 90 is operated intermittently and upper die member 91 is maintained above and out of contact with web W until the length of dyed web W moved into the die press 90 equals the length of web passing over printing roll 15 during one complete revolution of cam 40. Dog 99 trips switch 98 to deenergize solenoid 102 of relay 103 to close circuit 105 and open circuit 104 thereby stopping motor 96 and thus rolls 94 and 95. Closing of circuit 105 starts motor 97 to lower and then raise die member 91. Lowering of member 91 cuts from web W an interlayer for a laminated glass assembly. Relay 103 after a predetermined period of time opens circuit 105 and closes circuit 104 to stop motor 97 and start motor 96. Started motor 96 resumes rotation of rolls 94 and 95 and movement of web W by rolls 94 and 95 is resumed.

During the short period necessary for press 90 to cut out the interlayer, web W is being fed by rolls 14 continuously to dancer roll 81 which moves downwardly in slots 84 to take up the slack. The speed and size of rolls 94 and 95 are such that web W is pulled by rolls 94 and 95 into die press 90 at a faster rate than web W passes between rolls 14. As a result rotating dancer roll 81 is moved upward by moving web W to the position indicated in dotted lines in FIGURE 1. At that moment rolls 94 and 95 are stopped by dog 99 actuating switch 98 and die press 90 cuts web W as described above.

A wide variety of light-absorbing dyes can be used for dye solution 55 mentioned above in the description of the apparatus and its method of operation. A preferred dye solution is a solution of an anthraquinone-type of green dye commonly referred to as anthraquinone green GN. It is the sodium salt of 1:4-di-o-sulpho-p-tolylaminoanthraquinone and has Colour Index No. 1078 ("Colour Index," first edition, January 1924, published by the Society of Dyers and Colourists, Bradford, Yorkshire, England). This dye is used in the amount of about 0.25 gram per 100 ml. of solvent. In addition the dye solution preferably contains 10 grams of polyvinyl butyral resin and 3.8 grams of a plasticizer, such as triethylene glycol di-2-ethylbutyrate (otherwise known as triglycol dihexoate) per 100 ml. of solvent. The solvent is preferably 60 volume percent methyl alcohol, 25 volume percent ethylene glycol monomethyl ether and 15 volume percent methyl ethyl ketone. When using this dye solution and using a dye-printing roll 15 having cavities $1.2 \times 10^{-2}$ mm. (approximately 0.0005 inch) deep sufficient dye will be deposited in the Vinal, so that after heating to an elevated temperature such as 50° C., to eliminate any mottled effect and to remove solvent, the dyed Vinal decreases light transmission about 85 percent. Of course, when the roll has graduated concavities across its surface, as described above as the preferred embodiment, and when the largest cavities are $1.2 \times 10^{-2}$ mm., a suitable graduated band of light-absorbing material in web W for cutting into interlayers for laminated glass assemblies is obtained.

The dye-printing assembly using roll 15 has advantages over that using roll 115. For example, roll 15 can be much smaller in diameter thereby reducing the cost of making the roll. For the preparation of laminated glass assemblies with any pattern of graduation of intensity of the colored band only one roll is necessary for the preparation of various nonrectilinear bands. Change in band pattern is accomplished by change of cam only. The assembly using roll 15 requires apparatus for reciprocation of roll 15 whereas the assembly using roll 115 does not require reciprocating means. However roll 115 must have a diameter to provide a circumference equal to the length of the pattern from which an interlayer is cut. This large size increases cost.

As can be seen from FIG. 2, the web of thermoplastic material has a curved colored dyed band extending longitudinally adjacent a longitudinal margin of the web and comprising only curved colored dyed band portions on adjoining longitudinal portions of the web. Each of the dyed band portions has a curvature repeated by the curvature of the adjoining curved colored dye band portions on adjoining portions of the web. The centers of curvature of the colored dyed band portions are different and thus are spaced from one another. All of the curvatures of the curved colored dyed band have centers of curvature on the same side of the colored band. The dimensions of each longitudinally extending portion of the web containing one curved colored dyed band portion only is sufficiently large to provide one interlayer for a laminated automobile windshield.

The embodiment of the curved colored dyed band shown in FIG. 2 has curved portions in each of which there is a uniform radius of curvature. In this case the curved band has one of its edges as a cycloid curve, which is a curve described by a point on a circle which rolls along a fixed straight line as seen on page 27 of "The Engineers' Manual" by Ralph G. Hudson, second edition, published by John Wiley & Sons, Inc., New York, N.Y., in 1939. In the embodiment of FIG. 2 the edges of web W are rectilinear.

The dye-printing roll 15 is supported in the path of travel of the web W of thermoplastic material to provide contact with a surface of moving web W. Each of the edges of roll 15 is planar. These planes are parallel. The contact between roll 15 and web W of thermoplastic material is displaced transversely of the path of travel of web W although the contact is adjacent a longitudinal margin of web W. The transverse displacement of contact between roll 15 and web W is provided in the apparatus by reciprocation of roll 15 during its rotation. The reciprocation is between first and second positions.

The transverse displacement of contact between roll 115 and web W occurs during the rotation of roll 115 because neither of its edges of its printing portion is planar. The reciprocation is unnecessary when using roll 115, although proper coordination of its reciprocation with the portion of roll 115 making contact can produce the same general type of curvature as when using the roll without reciprocation; but, obviously, the radii of curvature of the curved colored dyed band portions will be different from those in the band portions when roll 115 is not reciprocated along its axis of rotation.

As seen also from FIG. 2, the outline of the pattern cut interlayer formed from one of the longitudinally extending portions of web W indicates the web is cut transversely at about positions on the dyed sheet corresponding to the positions of contact of roll 15 with web W when roll 15 is at one of its two positions between which it reciprocates.

Regardless of the method of dyeing a nonrectilinear colored band in a repeating pattern followed by cutting to form interlayers, the latter are assembled between pairs of matched curved or bent glass and the assemblies are laminated by methods well known to those skilled in the art.

The apparatus disclosed in this application is the subject of copending application Serial No. 710,283, filed on January 21, 1958, and entitled "Apparatus for Dyeing Plastic Sheets for Curved Laminated Glass Assemblies."

The foregoing detailed description and specific example are given by way of illustration only and, while indicating the preferred embodiment of the invention is not given by way of limitation, since various changes and modifications within the spirit and scope of the invention become apparent to those skilled in the art from this detailed description.

I claim:

1. A method of dyeing a thermoplastic sheet which comprises moving a thermoplastic sheet in a path of travel through a dye-printing zone, supporting a dye-printing roll in the path of travel in the zone to contact transversely of the path of travel a surface of the sheet adjacent a longitudinal margin of the sheet, changing the position of contact of the roll against the moving sheet by reciprocating movement of the contact transversely of the path of travel of the sheet between a first position of contact and a second position of contact, with transverse displacement of the contact from the first position to the second position being at a decreasing rate only and with transverse displacement of the contact from the second position to the first position being at an increasing rate only, and applying dye to the roll for imparting dye to the sheet at the contact between the moving sheet and the roll, whereby a curved colored dyed band extending longitudinally of the sheet is imparted to the sheet adjacent a longitudinal margin of the sheet and whereby the band comprises only curved colored dyed band portions on longitudinally extending adjoining portions of the sheet, with each of the colored band portions having a curvature repeated by the curvature of the adjoining curved colored dyed band portions on the longitudinally extending adjoining portions of the sheet, with all of the curvatures of the curved colored dyed band having different centers of curvature on the same side of the curved band, and with the dimensions of each longitudinally extending portion of the sheet being sufficiently large to provide an interlayer for a curved laminated automobile windshield.

2. A method of dyeing a thermoplastic sheet which comprises moving a thermoplastic sheet in a path of travel through a dye-printing zone, supporting a dye-printing roll in the path of travel in the zone to contact transversely of the path of travel a surface of the sheet adjacent a longitudinal margin of the sheet, rotating the roll about its axis of rotation, reciprocating the rotating roll along its axis of rotation while maintaining the contact between the roll and the surface of the sheet by movement of the rotating roll between a first position and a second position, with the movement of the roll from the first position to the second position being at a decreasing rate only and with the movement of the roll from the second position to the first position being at an increasing rate only, applying dye to the roll for imparting dye to the sheet at the contact between the moving sheet and the roll.

3. The method of claim 2 and further including the step of cutting the dyed sheet transversely at about positions on the dyed sheet corresponding to the positions of contact of the roll with the roll at the first position, whereby each of the cut portions is an interlayer for a curved laminated automobile windshield.

References Cited in the file of this patent

UNITED STATES PATENTS

| | | |
|---|---|---|
| 271,782 | Buchanan | Feb. 6, 1883 |
| 954,751 | Mann | Apr. 12, 1910 |
| 1,235,805 | Jennings | Aug. 7, 1917 |
| 1,385,185 | Meahl | July 19, 1921 |
| 1,900,143 | Snow | Feb. 5, 1933 |
| 1,937,858 | Taber | Dec. 5, 1933 |
| 2,089,225 | Polachek | Aug. 10, 1937 |
| 2,233,865 | Graham | Mar. 4, 1941 |
| 2,299,827 | Koester | Oct. 27, 1942 |
| 2,357,471 | Jalbert | Sept. 5, 1944 |
| 2,461,603 | Hunter et al. | Feb. 15, 1949 |
| 2,560,566 | Graves et al. | July 17, 1951 |
| 2,593,405 | Beckham | Apr. 22, 1952 |
| 2,593,525 | Beckham | Apr. 22, 1952 |
| 2,638,050 | King | May 12, 1953 |
| 2,725,320 | Atkeson | Nov. 29, 1955 |